United States Patent [19]

Welty

[11] Patent Number: 4,964,438

[45] Date of Patent: Oct. 23, 1990

[54] AIR DUCT PLUG

[75] Inventor: Ronald S. Welty, 1605 Crown Dr., Reno, Nev. 89503

[73] Assignee: Ronald S. Welty, Reno, Nev.

[21] Appl. No.: 415,969

[22] Filed: Oct. 2, 1989

[51] Int. Cl.⁵ .............................................. F16L 55/10
[52] U.S. Cl. ..................................... 138/89; 126/319
[58] Field of Search .................. 138/89, 96 R, 96 T; 4/295; 126/319; 34/82, 86; 292/251.5

[56] References Cited

U.S. PATENT DOCUMENTS

| 537,864 | 4/1895 | Smith | 4/295 |
| 620,129 | 2/1899 | Higgins | 126/319 |
| 3,038,631 | 6/1962 | Calder | 138/89 |
| 4,137,647 | 2/1979 | Clark | 138/89 |
| 4,194,494 | 3/1980 | Wagner | 138/89 |

Primary Examiner—James E. Bryant, III

[57] ABSTRACT

An air duct plug is provided for obturating an open end of an air duct during periods of nonuse to prevent or limit the escape of cooled or heated air through said air duct, in a dwelling, public building or structure thereof. The plug further provides a depending handle for ease of removal from the air duct when it is determined that said air duct should be used.

1 Claim, 4 Drawing Sheets

AIR DUCT PLUG

FIELD OF SEARCH

52/2; 52/126.2; 52/302; 52/309.4; 52/309.15; 138/89.1-89.4; 52/39; 439/450; 98/56; 222/562; 222/563; 220/215; 220/226; 220/307; 220/361; 138/40; 138/89; 222/544; 222/545; 222/548; 222/554; 222/556; 222/557; 126/49; 126/319; 138/96.

CROSS REFERENCES U.S. PATENT DOCUMENTS 3,078,879, 4/1958 Mallard . . . 138/96; 3,574,312, 2/1969, Miller . . . 138/96; 3,578,027, 7/1969, Zopfi . . . 138/89; 3,821,969, 5/1972, Sinko . . . 138/89; 3,847,183, 11/1972, Meyer . . . 138/96; 4,194,494, 11/1977, Wagner . . . 126/319; 4,649,896, 8/1985, Formosa . . . 126/319; 4,762,115, 8/1987, Penner . . . 126/319.

BACKGROUND OF THE INVENTION

The change of season facillitates the need to temporarily obturate a ventillation duct to prevent or limit the escape of cooled or heated air introduced into a dwelling by its respective system.

To date, there is not one product on the market that will obturate the open end of a ventillation duct and provide both an airtight seal and highly insulative qualities.

Heretofore occupiers of dwellings with heating and cooling or ventillation systems would commonly use whatever is handy, i.e., rags, towels, blankets, plastic sheeting or protective covers. None of these methods provide the same level of sealing and insulative qualities along with ease of installation, removal, and protection from damage to the ventillation duct and its immediate surrounding area.

SUMMARY OF THE INVENTION

The present invention, by providing a plug having a body slightly larger than the aperture to be obturated, is substantially comprised of a resilient material for ease of installation and producing a secure fit by way of a frictional and compressive engagement of the outermost surface of the plug body with the internal surface of the air duct to be obturated.

The many objects and advantages of the present invention will become apparent to those skilled in the art when the best mode contemplated for practicing the invention is read in conjunction with the accompanying drawings.

BRIEF DESCRIPTION OF THE DRAWINGS

In the drawings, wherein like reference numerals refer to corosponding parts.

DETAILED DESCRIPTION OF THE PREFERRED EMBODIMENT

As shown in FIGS. 1-6, a plug according to the present invention takes the form of a relatively solid body 11, substantially cylindrical in shape and made of a resilient material, such as polyurethane foam of the like. Immediately contiguous to the top side of the plug body 11, is a supporting base 12, with an adjoining reinforcement ring 13. Both supporting base 12 and reinforcement ring 13 are made of a relatively rigid plastic material such as ABS or the like, and serve to support the plug body 11, during removal of the embodiment from an air duct.

Figure 1:
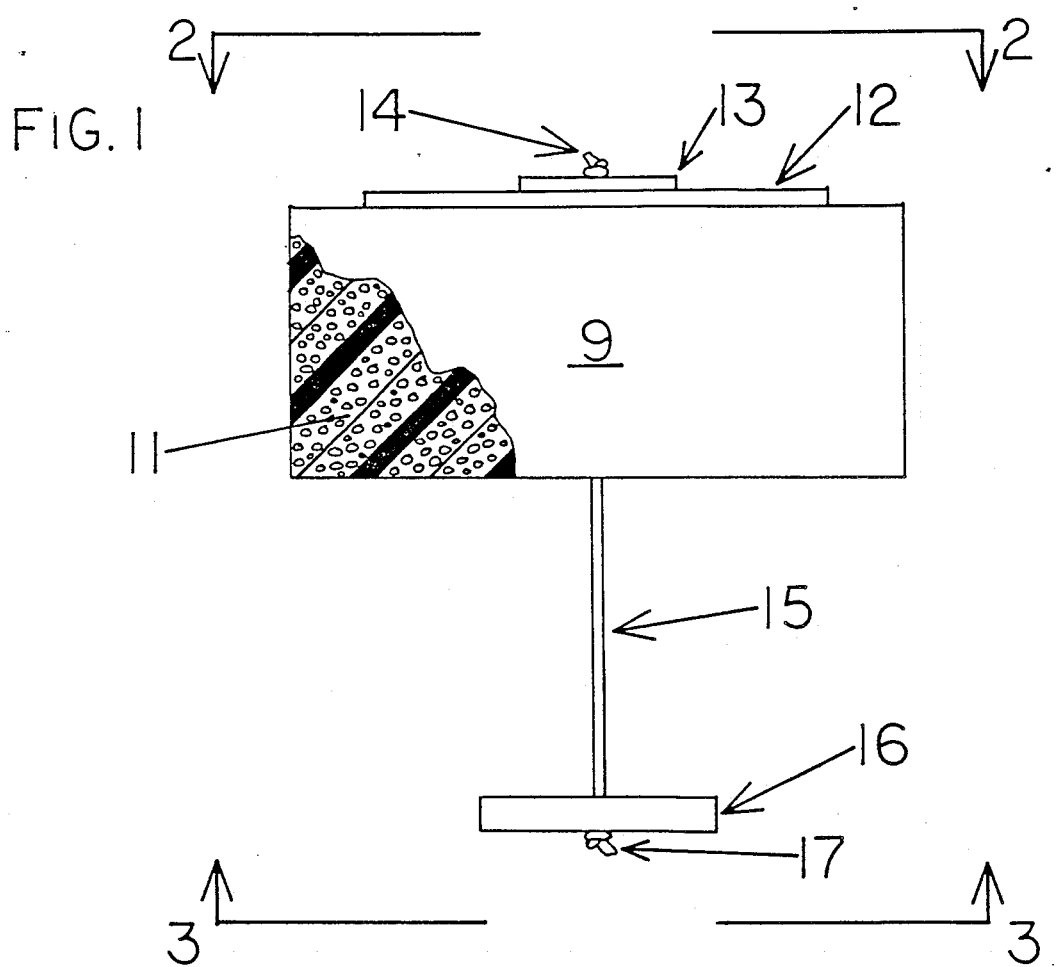
FIG. 1 represents a side view of the embodiment of a plug according to the present invention with a portion broken away.
Figure 2:
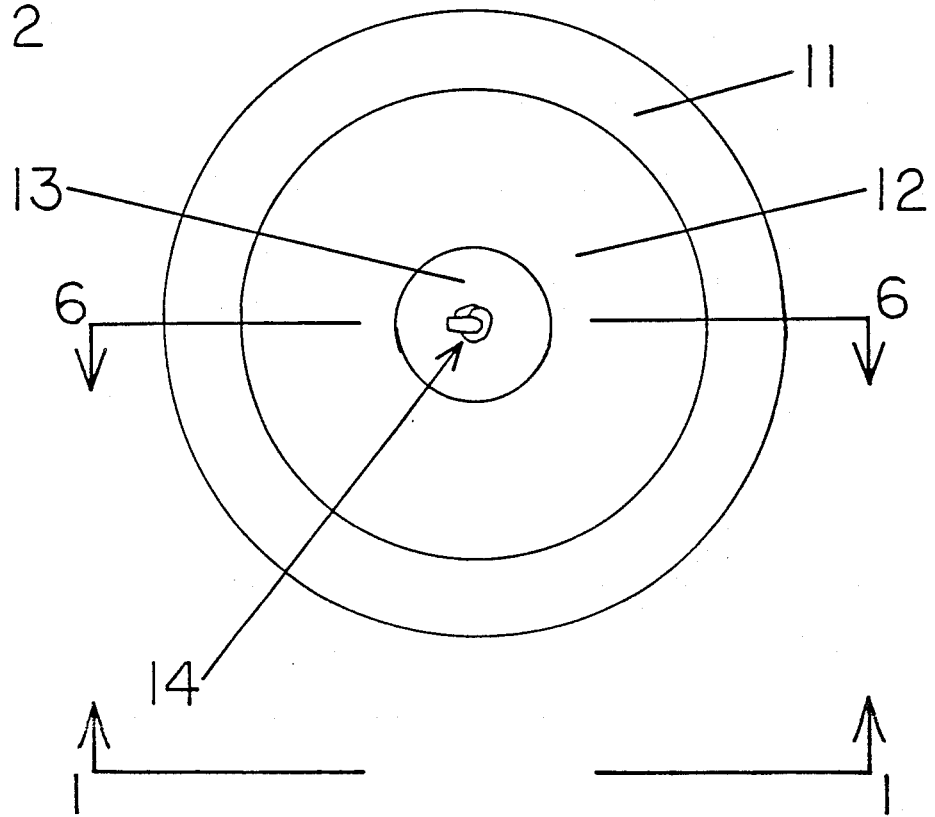
FIG. 2 represents a top view of the embodiment of the invention shown in FIG. 1.
Figure 3:
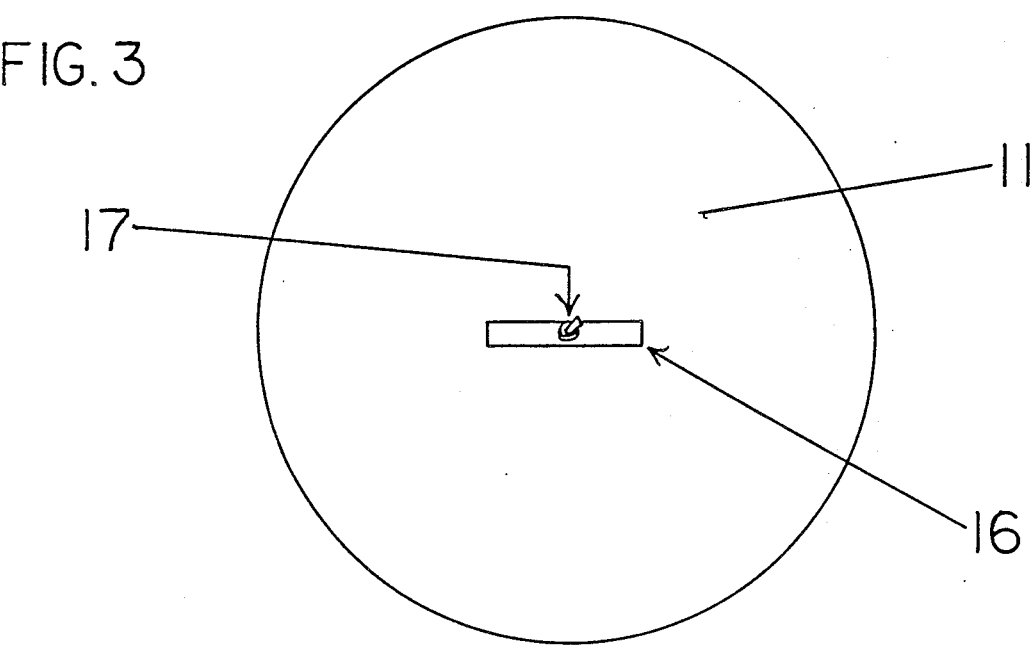
FIG. 3 represents a bottom view of the embodiment of the invention shown in FIG. 1.
Figure 4:
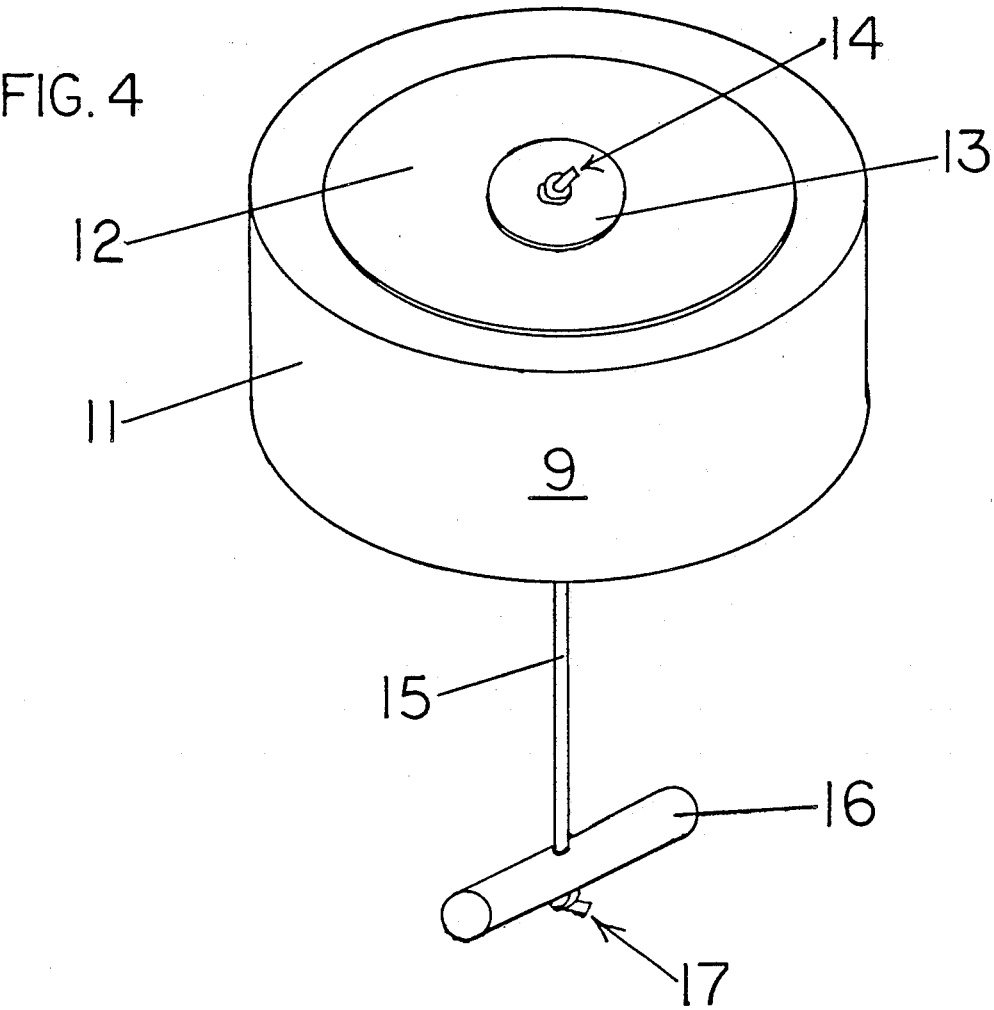
FIG. 4 represents a pictorial view of the embodiment of the invention shown in FIG. 1.
Figure 5:
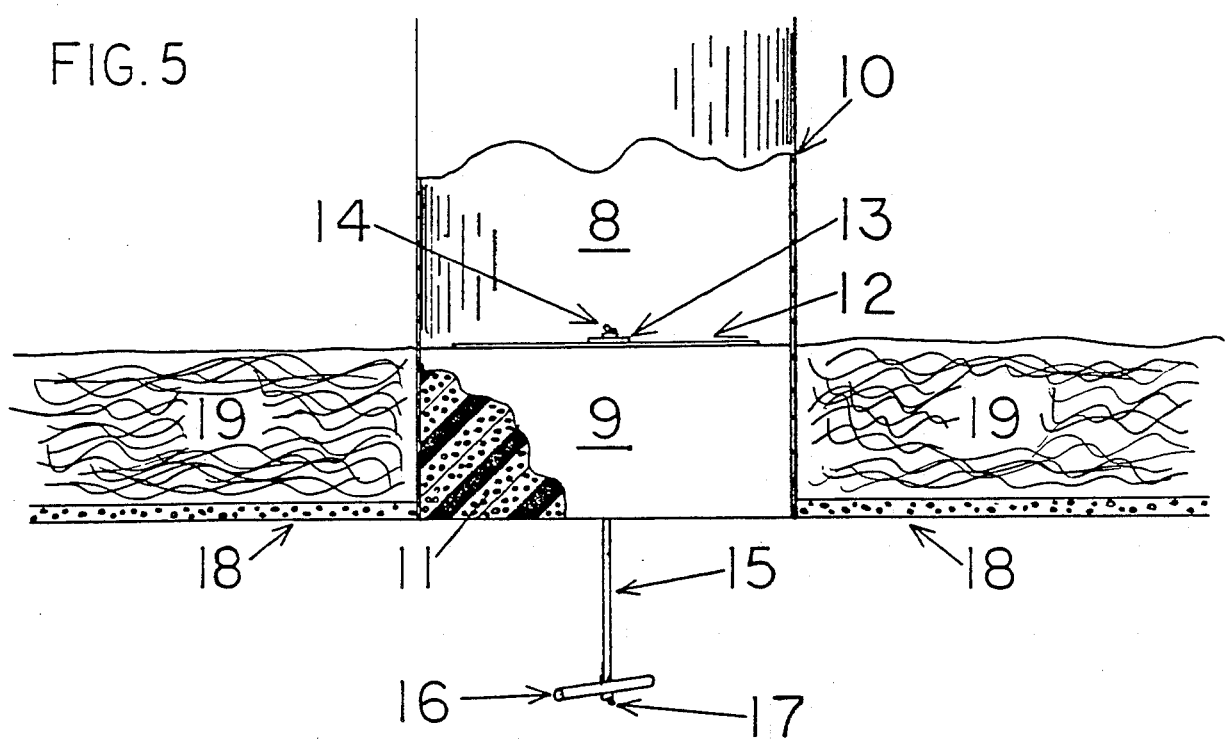
FIG. 5 represents a schematic view of an air duct employing a preferred embodiment of the present invention in an active position with a portion broken away.

The plug of the invention is used to obturate an aperture of any diameter within a predetermined range. For example, a plug of the invention can be used, as schematically illustrated in FIG. 5, for closing the preferred open end of an air duct, such as shown at 10, in a temporary manner. A ceiling structure 18, is also shown, having a cylindrical air duct 10 surrounded by insulation 19, with the preferred embodiment of the invention inserted in an active position inside air duct 10.

In the preferred embodiment, body 11 is cut from lightweight but highly insulative polyurethane foam. Thus, body 11 is of an appropriate thickness to provide adequate insulation for the prevention of heated air or cooled air loss through an air duct when the embodiment is in the active position as seen in FIG. 5.

Because the plug body 11 is originally of a greater diameter than the aperture of the air duct 10 to be obturated and is made of a resilient material, when the plug body 11 is compressed and forced into the open end of an air duct 10, the plug body 11 is caused to expand within the air duct 10, thus providing a frictional engagement between the cylindrical surface 9 of the plug body 11, and the inner cylindrical surface 8 of the air duct 10, promoting a secure fit until such time that it is deemed practical and proper for removal of said plug.

Figure 6:
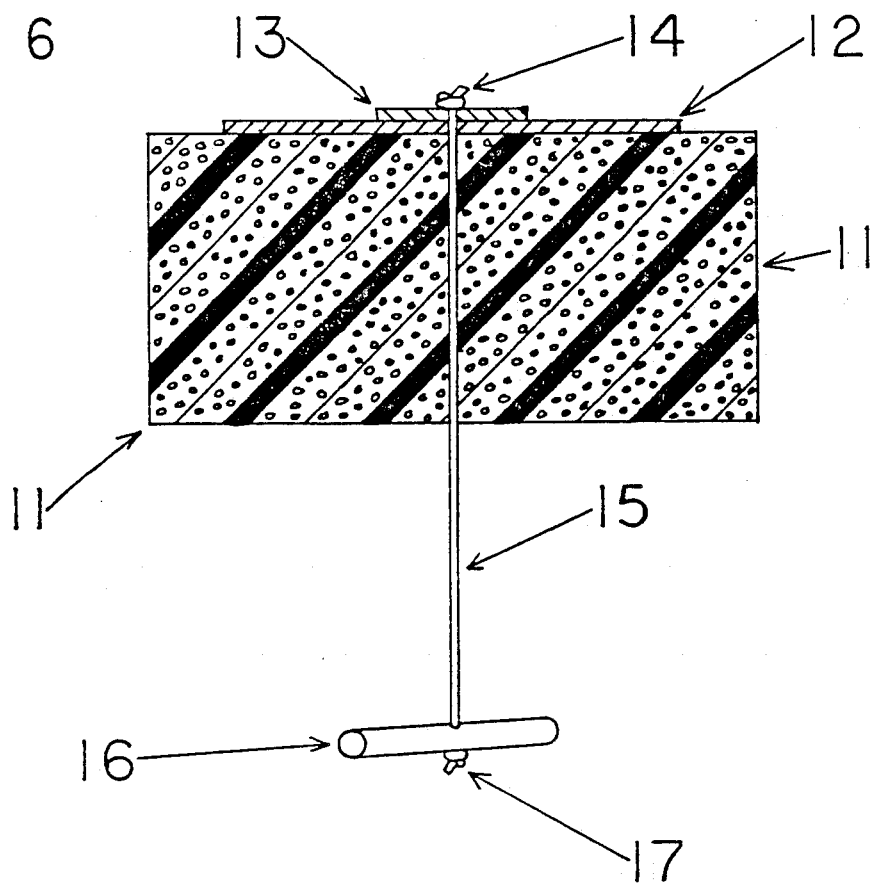
FIG. 6 represents a sectional view thereof as seen from line 6—6 of FIG. 2.

As seen in FIG. 6, running vertically through the center of the embodiment of the present invention is a rope like cord 15, secured at both ends by non fraying knots 14 and 17 respectively. Adjoining the cord 15 at the bottom end adjacent to the bottom knot 17, is a graspable handle 16, made of any rigid, solid or hollow, natural or man made material. The cord 15 serves as a means to attach said graspable handle 16 to the reinforcement ring 13 and supporting base 12, to allow for easy removal of the embodiment from an air duct.

Removal of the preferred embodiment is achieved by grasping handle 16 and pulling with sufficient force which will be transmitted from knot 17 through cord 15 to top knot 14 which in turn produces sufficient force axially on reinforcement ring 13 and support base 12 to extract plug body 11 from air duct 10.

Figure 7:
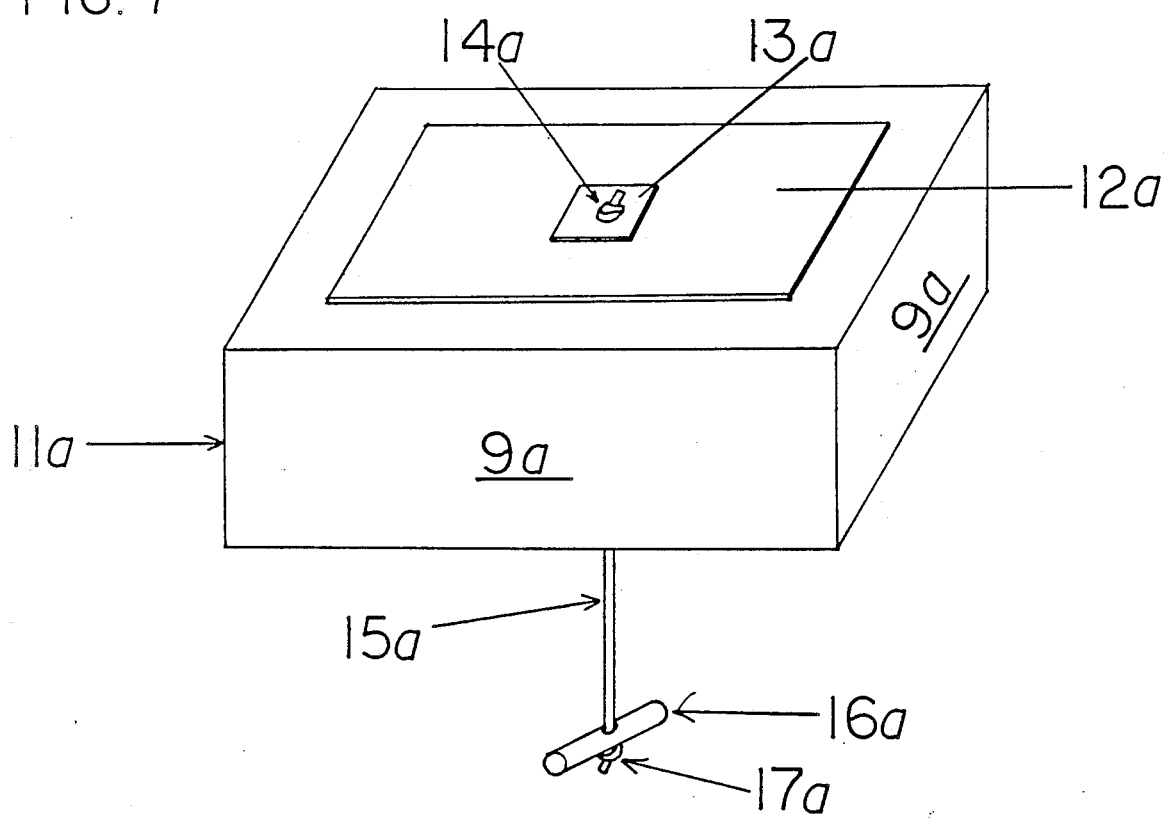
FIG. 7 is a pictorial view of the present invention in an alternative embodiment.

An alternative embodiment of the present invention is illustrated in FIG. 7 where suffix "a" has been added to describe elements similar to those described in connection with the first embodiment of the invention. Air duct plug 11a is similar in structure and function to air duct plug 11 and is used for air ducts having a square shape. Body 11a is similarly shaped like a short box so as to permit walls 9a to be complimentary to the inside wall of a square air duct and produce an even fit along with adequate sealing. Handle 16a, support structure, 13a connected integrally with 12a, along with a connecting means 15a, provide a means for easy removal.

Figure 8:
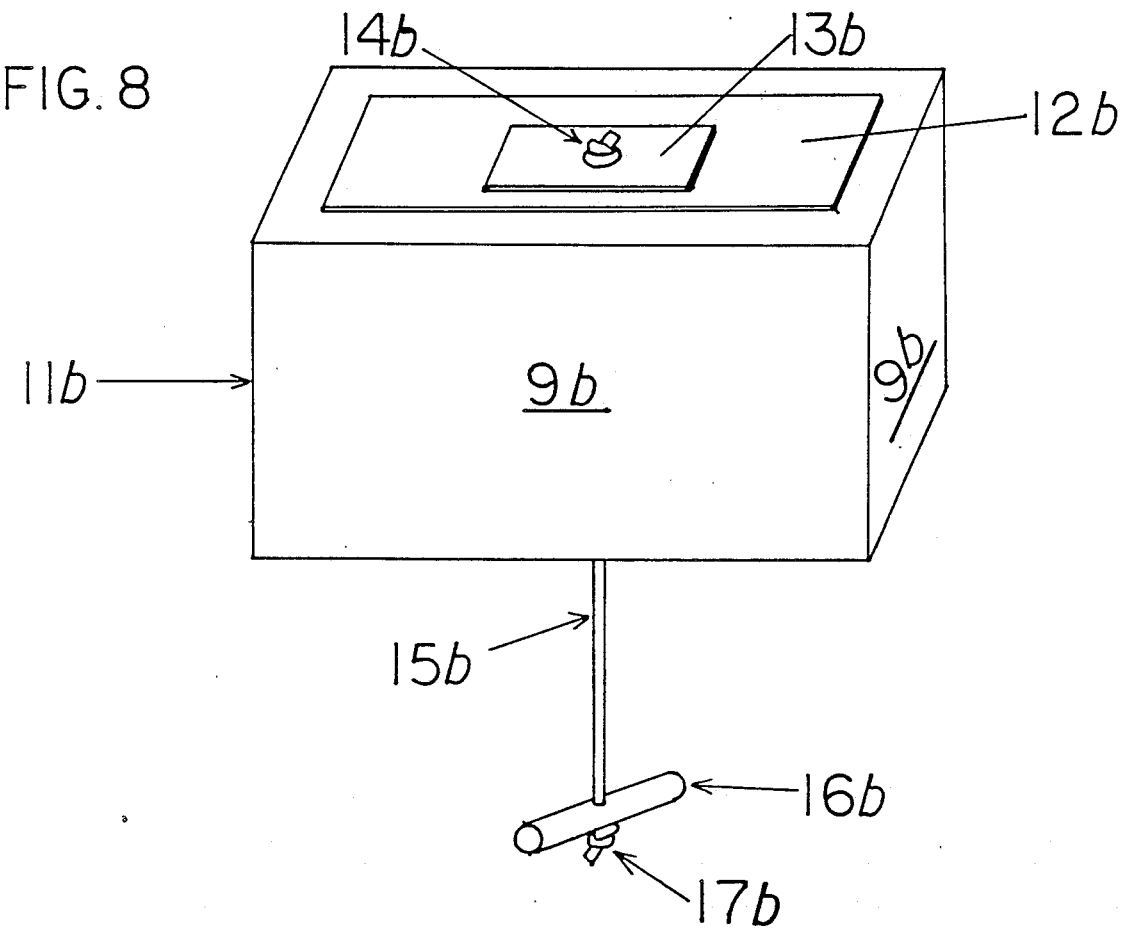
FIG. 8 is a pictorial view of yet another alternative embodiment of the present invention.

Yet another alternative embodiment of the present invention for use with air ducts having a rectangular shape is shown in FIG. 8. Suffix "b" will be used to describe elements similar to those described in connection with the first embodiment of the invention. The body 11b and walls 9b are substantially rectangular in shape so that said body 11b and walls 9b may fit tightly and evenly in rectangular air ducts. Support structure, 13b and 12b respectively, is also rectangular in shape to compliment the shape of the air duct to be obturated, and provide an even distribution of force when the embodiment is to be removed from said rectangular air duct.

As can be seen by the above descriptions, the present invention provides a product that is lightweight, uncomplicated, economical to manufacture, and of value to the public at large.

It will, of course, be understood that modifications of the present invention, and its various aspects, will be apparent to those skilled in the art, some being apparent only after study, and others merely matters of routine mechanical design. As such, the scope and the invention itself, should not be limited by the particular imbodiments and specific constructions herein described, rather the invention should be defined only by the appended claims, and equivalents thereof.

Having described the invention by way of a practical embodiment thereof, what is claimed as novel and sought to be protected by United States Patent is as follows:

1. A plug for the purpose of obturating an open end of an air duct during periods of nonuse comprising:
    a resilient plug body larger than the aperture of the air duct to be obturated with a body wall complimentary to the shape of said air duct, providing a compressive and frictional engagement of the outer surface or walls of the plug body with the inner surface of said air duct, said body being of substantial thickness, when inserted into an active position, obstructs said air duct while providing insulative qualities;
    a support base made of a rigid material and shaped in a complimentary fashion to said body and provided with a center aperture;
    a reinforcement ring, integrally connected to said support base, also made of a rigid material, shaped in a complimentary fasion to said body so as to strengthen said support base, and is also provided with a center aperture substantially equal in diameter and axially parallel with said support base aperture;
    a depending handle with a connecting means of predetermined length running axially through the plug body, support base, and reinforcement ring and secured at both ends by non fraying knots.

* * * * *